(12) United States Patent
Bergmann et al.

(10) Patent No.: US 12,715,501 B2
(45) Date of Patent: Aug. 25, 2026

(54) HYDRAULIC POWER STEERING SYSTEM

(71) Applicant: HYDAC NEW TECHNOLOGIES GMBH, Sulzbach/Saar (DE)

(72) Inventors: Erhard Bergmann, Banzkow (DE); Markus De La Motte, Muchow (DE); Helmut Funk, Karrenzin (DE)

(73) Assignee: HYDAC NEW TECHNOLOGIES GMBH, Sulzbach/Saar (DE)

(*) Notice: Subject to any disclaimer, the term of this patent is extended or adjusted under 35 U.S.C. 154(b) by 619 days.

(21) Appl. No.: 18/030,341

(22) PCT Filed: Sep. 15, 2021

(86) PCT No.: PCT/EP2021/075293
§ 371 (c)(1),
(2) Date: Apr. 5, 2023

(87) PCT Pub. No.: WO2022/073734
PCT Pub. Date: Apr. 14, 2022

(65) Prior Publication Data

US 2023/0373557 A1 Nov. 23, 2023

(30) Foreign Application Priority Data

Oct. 7, 2020 (DE) ..................... 10 2020 006 165.6

(51) Int. Cl.
*B62D 5/09* (2006.01)
*B62D 5/12* (2006.01)
(Continued)

(52) U.S. Cl.
CPC ............... *B62D 5/09* (2013.01); *B62D 5/091* (2013.01); *B62D 5/12* (2013.01); *B62D 5/30* (2013.01);
(Continued)

(58) Field of Classification Search
CPC . B62D 5/09; B62D 5/091; B62D 5/12; B62D 5/30; B62D 5/065; F15B 11/08;
(Continued)

(56) References Cited

U.S. PATENT DOCUMENTS 3,038,449 A * 6/1962 Murphy, Jr. ........ F15B 11/0426 91/363 R
3,482,486 A * 12/1969 Nordholm, Jr. ......... B64C 13/42 91/509

(Continued)

FOREIGN PATENT DOCUMENTS

DE 196 15 544 10/1997
DE 198 55 405 6/2000

(Continued)

OTHER PUBLICATIONS

International Search Report (ISR) issued Jan. 20, 2022 in International (PCT) Application No. PCT/EP2021/075293.

*Primary Examiner* — Dustin T Nguyen
(74) *Attorney, Agent, or Firm* — Wenderoth, Lind & Ponack, L.L.P.

(57) ABSTRACT

A hydraulic power steering system includes: a steering actuator; first and second subsystems each including a flow-control valve arrangement including a relief valve; and a fault detection device. The fault detection device is configured to: (i) determine and deactivate a faulty component of the first or second subsystems; and (ii) cause a fault-free component of the first or second subsystems to maintain control of the steering actuator. The flow-control valve arrangement of each of the first and second subsystems includes an inlet valve and a discharge valve, the inlet valve and the discharge valve being continuous-control valves configured to be electrically actuated by control signals that, when the control signals are compared with each other by the fault detection device and a deviation from reference (Continued)

data is determined, lead to deactivation of at least one of the relief valves or the continuous-control valves that is detected as faulty.

11 Claims, 1 Drawing Sheet

(51) Int. Cl.

| | |
|---|---|
| ***B62D 5/30*** | (2006.01) |
| ***F15B 11/08*** | (2006.01) |
| *B62D 5/065* | (2006.01) |

(52) U.S. Cl.

CPC .............. *F15B 11/08* (2013.01); *B62D 5/065* (2013.01); *F15B 2211/20576* (2013.01); *F15B 2211/30525* (2013.01); *F15B 2211/30565* (2013.01); *F15B 2211/3057* (2013.01); *F15B 2211/3138* (2013.01); *F15B 2211/3144* (2013.01); *F15B 2211/35* (2013.01); *F15B 2211/351* (2013.01); *F15B 2211/353* (2013.01); *F15B 2211/365* (2013.01); *F15B 2211/40515* (2013.01); *F15B 2211/413* (2013.01); *F15B 2211/41509* (2013.01); *F15B 2211/41554* (2013.01); *F15B 2211/426* (2013.01); *F15B 2211/427* (2013.01); *F15B 2211/513* (2013.01); *F15B 2211/5151* (2013.01); *F15B 2211/5156* (2013.01); *F15B 2211/526* (2013.01); *F15B 2211/634* (2013.01); *F15B 2211/6655* (2013.01); *F15B 2211/7054* (2013.01); *F15B 2211/86* (2013.01); *F15B 2211/862* (2013.01); *F15B 2211/8636* (2013.01); *F15B 2211/87* (2013.01); *F15B 2211/8757* (2013.01)

(58) Field of Classification Search

CPC .. F15B 2211/20576; F15B 2211/30525; F15B 2211/30565; F15B 2211/3057; F15B 2211/3138; F15B 2211/3144; F15B 2211/35; F15B 2211/351; F15B 2211/353; F15B 2211/365; F15B 2211/40515; F15B 2211/413; F15B 2211/41509; F15B 2211/41554; F15B 2211/426; F15B 2211/427; F15B 2211/513; F15B 2211/5151; F15B 2211/5156; F15B 2211/526; F15B 2211/634; F15B 2211/6655; F15B 2211/7054; F15B 2211/86; F15B 2211/862; F15B 2211/8636; F15B 2211/67; F15B 2211/8757

See application file for complete search history.

(56) References Cited

U.S. PATENT DOCUMENTS

| | | | | |
|---|---|---|---|---|
| 3,724,330 | A * | 4/1973 | Mason | G05D 1/0077 91/363 A |
| 3,813,990 | A * | 6/1974 | Coppola | F15B 9/03 91/20 |
| 5,353,685 | A * | 10/1994 | Snow | G05B 19/4144 60/403 |
| 6,102,150 | A | 8/2000 | Bohner et al. | |
| 7,837,001 | B2 * | 11/2010 | Young | B62D 5/32 180/441 |
| 9,248,854 | B2 * | 2/2016 | Belshan | B62D 5/32 |
| 9,840,273 | B2 * | 12/2017 | Sullivan | B62D 5/30 |
| 10,829,908 | B2 * | 11/2020 | Saitoh | E02F 9/2235 |
| 11,125,254 | B2 * | 9/2021 | Erikksson | F15B 13/0435 |
| 11,231,053 | B2 * | 1/2022 | Eriksson | F15B 13/0417 |
| 2001/0011192 | A1 * | 8/2001 | Ondrla | A61F 2/4081 623/908 |
| 2004/0016461 | A1 | 1/2004 | Qu et al. | |
| 2007/0251753 | A1 * | 11/2007 | Clausen | B62D 5/001 180/414 |
| 2008/0087014 | A1 * | 4/2008 | Schick | B62D 5/001 60/403 |
| 2011/0277460 | A1 | 11/2011 | Brummund et al. | |
| 2019/0002018 | A1 | 1/2019 | Bergmann et al. | |

FOREIGN PATENT DOCUMENTS

| | | |
|---|---|---|
| DE | 103 24 949 | 12/2004 |
| DE | 10 2007 033 986 | 12/2008 |
| DE | 10 2010 020 722 | 11/2011 |
| DE | 10 2016 104 090 | 6/2017 |
| EP | 1 914 150 | 12/2009 |
| WO | 2004/013874 | 2/2004 |

* cited by examiner

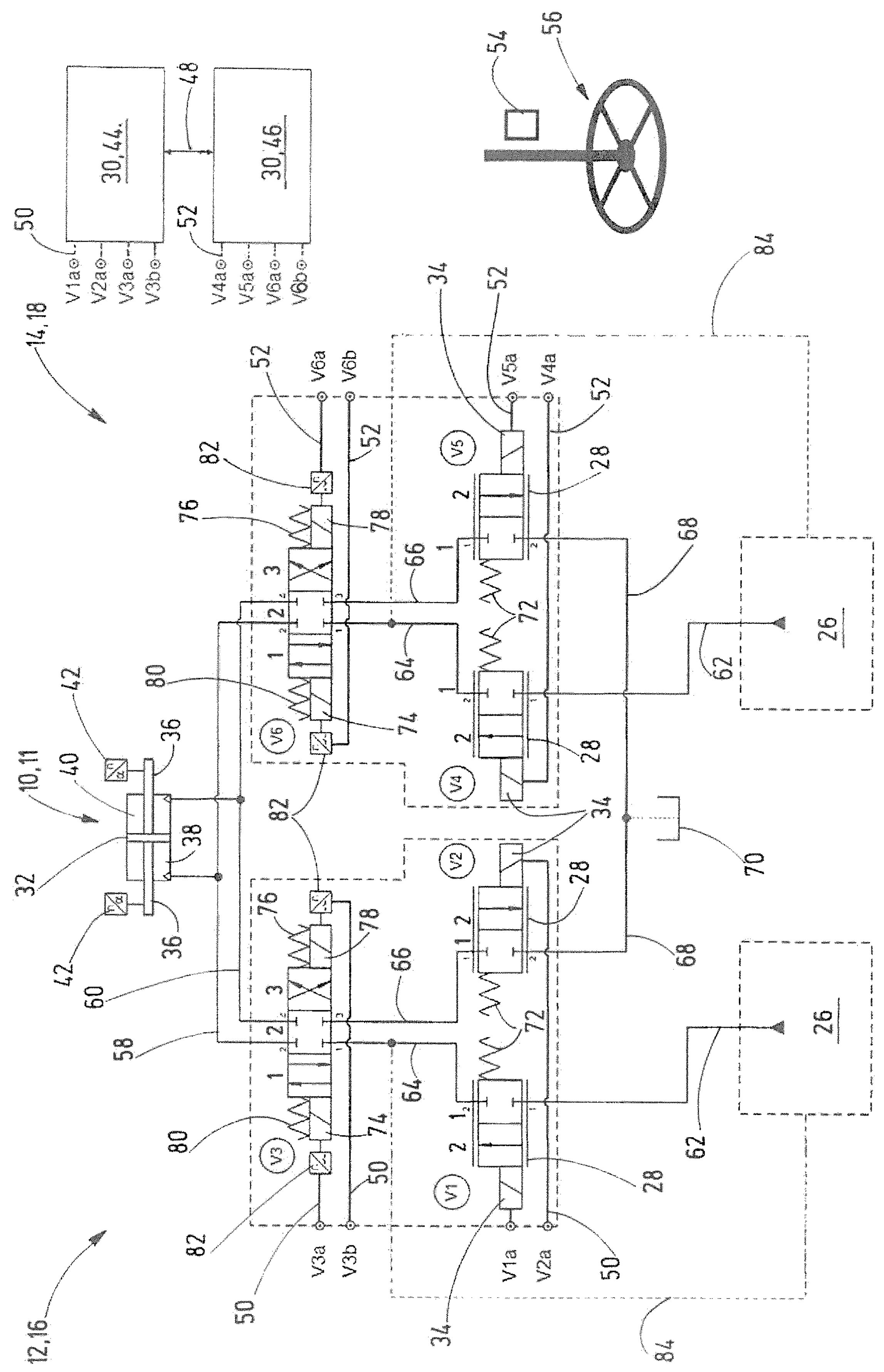
30,44.
30,46
48
50
52
54
56
14,18
12,16
10,11
V1a
V2a
V3a
V3b
V4a
V5a
V6a
V6b
V1
V2
V3
V4
V5
V6
26
84
62
68
70
72
28
34
64
66
74
76
78
80
82
58
60
32
36
38
40
42

HYDRAULIC POWER STEERING SYSTEM

BACKGROUND OF THE INVENTION

1. Field of the Invention

The invention relates to a hydraulic power steering system, at least consisting of a steering actuator, for the actuation of which in opposite steering directions two subsystems are used, each in the form of a flow-regulating valve arrangement having a release valve, and consisting of a fault detection device, by means of which at least one faulty component of respective subsystems can be determined and deactivated and by means of which the fault-free components of at least one subsystem can be caused to keep up the actuation of the steering actuator.

2. Description of the Related Art

DE 198 55 405 B4 discloses a hydraulic power steering system for motor vehicles. The power steering system has a manual steering wheel that can be actuated by the driver, two hydraulically double-acting servo motors as steering actuators, both of which are coupled to the same steered vehicle wheels to move them in accordance with the steering actuation, and an electronic regulation arrangement that has a steering angle setpoint sensor actuated by the manual steering wheel and an actual value transducer of the steering angle operated by the steered vehicle wheels.

The power steering system is redundant for safety reasons. For that reason, the servo motors are each actuated by a hydraulic circuit as a flow-regulating valve arrangement, which are identical and each of which can take over the steering operation by itself. Each hydraulic circuit has a motor-operated servo valve arrangement with a servo valve, a hydraulic pump, a monitoring device as a fault detection device and a freewheeling valve that can be toggled between a blocking position and a freewheeling position interconnecting both ends of the servo motor and connecting them to a reservoir. The individual servo valves of a hydraulic circuit are regulated by the regulation arrangement as a function of a steering angle setpoint/actual value comparison and are connected to the pressure end of the pump of this hydraulic circuit via a pressure port of this hydraulic circuit in a fluid-conveying manner, are connected to the suction end of the pump of this hydraulic circuit via a low-pressure port of this hydraulic circuit, and are connected to the two ends of the relevant servo motor via two motor ports of this hydraulic circuit. In the event of a fault in one of the hydraulic circuits detected by a sensor system, the monitoring device opens the freewheel valve of this hydraulic circuit, as a result of which the hydraulic circuit detected as faulty is placed in an inoperative state overall and the other hydraulic circuit, which remains operational, takes over the steering operation exclusively.

SUMMARY OF THE INVENTION

The invention addresses the problem of providing a hydraulic power steering system, which, in contrast, ensures a higher level of operational reliability.

A hydraulic power steering system described herein solves this problem.

The hydraulic power steering system according to the invention is characterized in that each flow-regulating valve arrangement has supply valves and discharge valves, which are assigned to each other in pairs, and are designed as proportional servo valves, and which can be actuated electrically by means of actuation signals, which, compared to each other by means of the fault detection device, lead to the deactivation of at least one valve detected as faulty in the event of deviations detected as relevant.

Because every flow-regulating valve arrangement has a supply valve and a discharge valve not only is each subsystem in the form of the flow-regulating valve arrangement redundantly protected overall—as in the state of the art—but the supply and discharge of every flow-regulating valve arrangement can also be protected individually. In the event of faulty operation of only one supply valve or discharge valve of one of the flow-regulating valve arrangements, the relevant faulty valve of this flow-regulating valve arrangement can be specifically deactivated, wherein at the same time the other valve of this flow-regulating valve arrangement remains in operation. This has the advantage that in the event of a total of two faulty valves, i.e., the faulty operation of a supply valve and simultaneously the faulty operation of a discharge valve, the steering operation can be kept up, even if both faulty valves are not part of the same flow-regulating valve arrangement. This improves the operational reliability of the steering system in a structurally very simple way. This is without parallel in the prior art.

In a particularly preferred embodiment of the power steering system according to the invention, provision is made during normal operation for the two flow-regulating valve arrangements to participate in a fixed correlation, preferably 50% each in the steering capacity for the steering actuator 10. In this way, particularly good, dynamic steering behavior can be achieved. Preferably, provision is also made, if at least one valve of a flow-regulating valve arrangement is detected to be faulty, for this to be deactivated and for the supply to the steering actuator to be taken over exclusively by the other flow-regulating valve arrangement that is detected to be functional. This ensures that even if a valve of a flow-regulating valve arrangement opens incorrectly, it is switched off safely and the second remaining flow-regulating valve arrangement now completely takes over the supply of the steering actuator.

The proportional servo valve can be designed as a flow-control valve, in particular a flow-regulating valve.

BRIEF DESCRIPTION OF THE DRAWING

Below, the hydraulic power steering system according to the invention is explained in more detail with reference to the drawing.

The single FIGURE shows in principle and not to scale, a hydraulic power steering system according to the invention in the manner of a hydraulic circuit diagram.

DETAILED DESCRIPTION OF THE INVENTION

The hydraulic power steering system comprises a steering actuator 10 and first 12 and second 14 subsystems for actuating the steering actuator 10 in opposite steering directions. Each subsystem 12, 14 is in the form of a flow-regulating valve assembly 16, 18 that comprises release valves V3, V6, supply valves V1, V4, discharge valves V2, V5, and a hydraulic pressure supply 26. The supply valves V1, V4 and discharge valves V2, V5 are each designed as proportional servo valves 28 and, in addition to the release valves V3, V6, can each be operated electrically by means of actuation signals.

Furthermore, the power steering system has a fault detection device 30, which is set up in such a way that it, if at least one supply valve V1, V4 and/or discharge valve V2, V5 as a functionally essential component of the respective flow-regulating valve arrangements 16, 18 is in a fault state, which is determined based on a correlation of the actuation signals of the supply valves V1, V4 and discharge valves V2, V5 and/or to a motion of the piston 32 of the steering actuator 10 caused by these actuation signals detects a deviation of the determined ratio from a reference ratio detects the relevant supply valve V1, V4 and/or discharge valve V2, V5 as faulty based on a deviation detected as relevant, and deactivates it/them, and causes the fault-free supply valves V1, V4 and/or discharge valves V2, V5 of the two subsystems 12, 14 to keep up the actuation of the steering actuator 10.

To correlate the actuation signals of the supply valves V1, V4 and discharge valves V2, V5, in particular to compare them to each other, the current picked up by a first actuating solenoid device 34 of a proportional servo valve 28 is fed back to the fault detection device 30 and evaluated there.

In fault-free steering operation, each flow-regulating valve arrangement 16, 18 permanently takes over 50% of the actuation of the steering actuator 10 with fluid in the form of hydraulic fluid, in particular oil. If components of a flow-regulating valve arrangement 16, 18 are at least partially faulty, the actuation ratio of the first 16 to the second 18 flow-regulating valve arrangement can change to 0% to 100% or vice versa. Designed in this way, the power steering system is protected by a so-called hot redundancy, which effectively prevents unwanted and thus possibly dangerous steering motions in the event of a faulty power steering system. Such a fault condition can be, for instance, a jamming of a valve spool of a valve as a component of the power steering system. For particularly reliable operation, however, it is envisaged that not only a valve which has been detected as faulty is excluded from further operation, but that in each case the assigned flow-regulating valve arrangement with its two valves is switched off completely and the remaining flow-regulating valve arrangement takes over exclusively the supply for the steering actuator, which takes place without any time delay, i.e., the operator does not notice a valve function fault at all from the actuation behavior.

The steering actuator 10 is designed as a single constant velocity cylinder 11, also called a double rod cylinder, which has a piston rod 36 on each end of its piston 32 as part of a steering gear (not shown in the FIGURE) for turning vehicle wheels of a vehicle. The steering actuator 10 may also be formed by two diagonally connected differential cylinders. The piston 32 separates a first fluid chamber 38 in the housing of the steering actuator 10 from a second fluid chamber 40 in the housing of the steering actuator 10. The steering actuator 10 is provided with a normal position monitor 42 as part of the fault detection device 30, which is used to monitor the travel position of its piston 32.

The respective release valves V3, V6 are designed as a 4/3-way directional valves. The supply valves V1, V4 and discharge valves V2, V5, each provided as proportional servo valves 28, are each designed as 2/2-way proportional valves for a load-independent control of a volume flow. The release valves V3, V6 of the two flow-regulating valve arrangements 16, 18 are of identical design and the proportional servo valves 28 of the two flow-regulating valve arrangements 16, 18 are also of identical design.

The fault detection device 30 is part of first 44 and second 46 steering control devices that are interconnected by an electrical signal line 48. The first 44 and second 46 steering control devices are connected to the first 16 and second 18 flow-regulating valve arrangements, respectively, via further electrical signal lines 50, 52, and to the position monitor 42 of the steering actuator 10 via a further electrical signal line not shown in the FIGURE. In addition, each steering control device 44, 46 is electrically connected to a steering angle command sensor 54 of a steering wheel 56 of the vehicle not shown in the FIGURE, for instance in the form of a machine. The machine can be designed as a so-called "off-highway" machine (driving speed up to 60 km/h), but preferably having the official approval and homologation for road service, such as in the form of a tractor, a wheeled excavator, a wheeled loader, a combine harvester or a track-driven vehicle. Provided that the legislator introduces appropriate provisions, however, the power steering system can also be used for normal passenger cars.

The first subsystem 12 in the form of the first flow-regulating valve assembly 16 and the second subsystem 14 in the form of the second flow-regulating valve assembly 18 are connected to the first 38 and second 40 fluid chambers of the steering actuator 10 in a fluid-conveying manner. Specifically, the first fluid chamber 38 of the steering actuator 10 is connected to respective second ports V3.2, V6.2 of the two release valves V3, V6 of each flow-regulating valve arrangement 16, 18 via a first fluid line 58 in a fluid-conveying manner, and the second fluid chamber 40 of the steering actuator 10 is connected to respective fourth ports V3.4, V6.4 of the release valves V3, V6 of each flow-regulating valve arrangement 16, 18 via a second fluid line 60 in a fluid-conveying manner.

The design of the second flow-regulating valve arrangement 18 is similar or equal to the design of the first flow-regulating valve arrangement 16, which is explained in more detail below as representative of both flow-regulating valve arrangements 16, 18:

The pressure-supply 26 is connected to a first port V1.1 of the supply valve V1 via a third line 62 in a fluid-conveying manner, the second port V1.2 of which supply valve V1 is connected to a first port V3.1 of the release valve V3 via a fourth fluid line 64 in a fluid-conveying manner. A third port V3.3 of the release valve V3 is connected to the first port V2.1 of the discharge valve V2 via a fifth fluid line 66 in a fluid-conveying manner, the second port V2.2 of which discharge valve V2 is connected to a tank 70 via a sixth fluid line 68 in a fluid-conveying manner.

The valve pistons of the supply valve V1 and of the discharge valve V2 can each be moved independently of each other from their respective first end positions 1 shown in the FIGURE by means of the first actuating solenoid device 34 against the force of a first energy store in the form of a first compression spring 72, in which first end positions the respective valve pistons separate the two ports V1.1, V1.2, V2.1, V2.2 of the respective valves V1, V2 from each other, into a second end position 2, in which the respective valve pistons connect the two ports V1.1, V1.2, V2.1, V2.2 of the respective valves V1, V2 to each other in a fluid-conveying manner via a fluid path. If the actuating solenoid of the relevant supply valve V1 or discharge valve V2 is not energized, this valve V1, V2 is held in its first end position 1, as shown in the FIGURE.

A second actuating solenoid device 74 can be used to move the valve piston of the release valve V3 in one direction of travel against the force of a second energy store in the form of a second compression spring 76 from its second switching position 2 shown in the FIGURE to its first switching position 1 and a third actuating magnet device 78 can be used to move it in an opposite direction of travel from its second switching position 2 to its third switching position 3 against the force of a third energy store in the form of a third compression spring 80. If the two actuating solenoids of the release valve V3 are not energized, the release valve V3 is held in its second switching position 2, which is its central switching position.

In the first switching position 1 of the valve piston of the release valve V3, the valve piston connects the first port V3.1 to the second port V3.2 and the fourth port V3.4 to the third port V3.3 of the release valve V3 in a fluid-conveying manner, each via an assigned fluid path. In the second switching position 2 of the valve piston of the release valve V3, the valve piston separates all ports V3.1, V3.2, V3.3, V3.4 of the release valve V3 from one another. In the third switching position 3 of the valve piston of the release valve V3, the valve piston connects the first port V3.1 to the fourth port V3.4 and the second port V3.2 to the third port V3.3 of the release valve V3 in a fluid-conveying manner, via one further fluid path each.

A normal switching position monitoring device 82 is provided on the release valve V3 for its valve piston as part of the fault detection device 30. One end of a load-sensing line 84 is connected to the fourth fluid line 64 between the second port V1.2 of the supply valve V1 and the first port V3.1 of the release valve V3, in terms of a hydraulic load tap, the other end of which load-sensing line is connected to the hydraulic pressure supply 26. As a result, the inlet of the steering actuator 10 can be supplied at a presettable fluid pressure.

The first steering control device 44 is electrically connected to the actuating solenoid devices 34, 74, 78 of the release valve V3, of the supply valve V1 and of the discharge valve V2 via a further electrical signal line 50, for the purpose of actuation by means of the actuation signals and/or feedback of the current picked up by the respective actuating solenoid devices 34, 74, 78, and to the switching position monitor 82 of the valve piston of the release valve V3, which are each part of the first flow-regulating valve arrangement 16.

The function of the hydraulic power steering system according to the invention is explained in more detail below:

When an operator rotates the steering wheel 56, the steering angle setpoint generator 54 detects and transmits a setpoint value of the steering motion of the steering wheel 56 to the two steering control devices 44, 46. Based on the steering angle set point, the first 44 and second steering control devices 46 control the first 16 and second 18 flow-regulating valve assemblies, respectively. At the same time, the first 44 and the second 46 steering control devices receive the values of the position monitor 42 of the steering actuator 10, the switching position monitoring 82 of the release valves V3, V6 and the current consumption of the actuating solenoid devices 34 of the proportional servo valves 28, each of the first 16 and the second 18 current regulation devices, respectively.

In fault-free normal operation, to move the piston 32 of the steering actuator 10 in a direction of travel (to the right in the FIGURE), the first fluid chamber 38 of the steering actuator 10 is supplied by each hydraulic pressure supply 26, via the relevant supply valve V1, V4, whose valve piston is disposed in its second end position 2, and the relevant release valve V3, V6, whose valve piston is disposed in its first switching position 1. At the same time, the second fluid chamber 40 of the steering actuator 10 can be relieved towards the tank 70 via the relevant release valve V3, V6, whose valve piston is disposed in its first switching position 1, and the relevant discharge valve V2, V5, whose valve piston is disposed in its second end position 2. As a result, the piston 32 of the steering actuator 10 moves in the one direction of travel and entrains the steering linkage while performing a corresponding steering motion.

Moreover, in normal operation for moving the piston 32 of the steering actuator 10 in a further direction of travel opposite to this direction (to the left in the FIGURE), the second fluid chamber 40 of the steering actuator 10 is supplied by each hydraulic pressure supply 26, via the relevant supply valves V1, V4, whose valve piston is disposed in its second end position 2, and the relevant release valve V3, V6, whose valve piston is disposed in its third switching position 3. At the same time, the first fluid chamber 38 of the steering actuator 10 can be relieved towards the tank 70 via the relevant release valve V3, V6, whose valve piston is disposed in its third switching position 3, and the relevant discharge valve V2, V5, whose valve piston is disposed in its second end position 2. As a result, the piston 32 of the steering actuator 10 moves in the further direction of travel and entrains the steering linkage while performing a corresponding steering motion.

If at least one of the supply valves V1, V4 and/or discharge valves V2, V5 is now set to a fault state, this is detected by the fault detection device 30 based on a correlation of the actuation signals of the supply valves V1, V4 and discharge valves V2, V5 and/or to a motion of the piston 32 of the steering actuator 10 supply valves by these actuation signals, and the relevant supply valve V1, V4 and/or discharge valve V2, V5 detected as faulty is deactivated. Furthermore, the fault detection device 30 reallocates the participation of the flow-regulating valve arrangements 16, 18 in the steering operation, the ratio of which is 50% to 50% in normal operation, depending on the remaining fault-free supply valves V1, V4 and discharge valves V2, V5, which then take over the actuation of the fluid chambers 38, 40 of the steering actuator 10 and in that way keep up the steering operation. Because of the re-division, the ratio of the participation of the flow-regulating valve arrangements 16, 18 in the steering operation may change. For increased safety, however, provision is made for the flow-regulating valve arrangement 16, 18 with the relevant valve V1, V2 or V4, V5 detected as faulty to be excluded from the supply and for the remaining flow-regulating valve arrangement 18, 16 to completely take over the hydraulic supply in an actuating manner.

For safe operation of the hydraulic power steering system, it is also advantageous to detect the position of a positioning element of an electrically drivable actuator, which in this case is the armature of a solenoid that actuates the relevant valve used, in particular a proportional servo valve.

WO 2004/013874 A1 specifies such a method for determining the armature position and thus the assumed switching position or travel position for the valve to be monitored. The position of the positioning element is determined by comparing the quotient of the on-time or off-time of the coil part assigned to the armature of the solenoid and the sum of on-time and off-time, and by comparing the sum of on-time and off-time to stored reference data. The inductances actually measured at the actuating coil provide an indication of the armature position, which in turn allows an indication of the regarded valve position. By comparison with reference data determined in the test, which can also be stored as part of a characteristic diagram, this provides a statement as to whether the valves V1, V2, V4, V5 are faulty as a whole and the control system then switches off the flow-regulating valve arrangement 16 or 18 assigned to the relevant valve. In addition or alternatively, provision may also be made to continuously monitor the inductance of every individual valve solenoid using the method according to WO 2004/013874 A1 and to disable the assigned flow-regulating valve arrangement 16, 18 if a valve is detected to be faulty.

The invention claimed is:

1. A hydraulic power steering system, comprising:

a steering actuator;

a first subsystem including a flow-control valve arrangement including a release valve;

a second subsystem including a flow-control valve arrangement including a release valve; and a fault detection device, wherein:

the first subsystem and the second subsystem are configured to control the steering actuator in opposite steering directions;

the fault detection device is configured to: (i) determine and deactivate a faulty component of the first subsystem or the second subsystem; and (ii) cause a fault-free component of the first subsystem or the second subsystem to maintain control of the steering actuator;

each of the flow-control valve arrangement of the first subsystem and the flow-control valve arrangement of the second subsystem includes an inlet valve and a discharge valve, the inlet valve and the discharge valve being continuous-control valves configured to be electrically actuated by control signals that, when the control signals are compared with each other by the fault detection device and a deviation from reference data is determined, lead to deactivation of at least one of the release valves or the continuous-control valves that is detected as faulty;

the steering actuator is a hydraulic synchronous cylinder including a first fluid chamber and a second fluid chamber;

the first fluid chamber and the second fluid chamber are separated by a piston;

each of the first fluid chamber and the second fluid chamber is directly connected to an output side of the release valve of the first subsystem and an output side of the release valve of the second subsystem; and each of the release valves includes a switching position monitor for a valve piston as part of the fault detection device.

2. The hydraulic power steering system of claim 1, wherein:

the flow-control valve arrangement of the first subsystem or the flow-control valve arrangement of the second subsystem is configured to deactivate the at least one of the release valves or the continuous-control valves that is detected as faulty; and the flow-control valve arrangement of the first subsystem or the flow-control valve arrangement of the second subsystem with the fault-free component is configured to take over supply to the steering actuator.

3. The hydraulic power steering system of claim 1, wherein:

the release valves are identical to each other; and the continuous-control valves are identical to each other.

4. The hydraulic power steering system of claim 1, wherein, the release valves and the continuous-control valves are configured to, in a de-energized state, be held in unoperated positions.

5. The hydraulic power steering system of claim 1, wherein each of the flow-control valve arrangement of the first subsystem and the flow-control valve arrangement of the second subsystem is configured to provide 50% of a steering capacity for the steering actuator.

6. A hydraulic power steering system, comprising:

a steering actuator;

a first subsystem including a flow-control valve arrangement including a release valve;

a second subsystem including a flow-control valve arrangement including a release valve; and a fault detection device, wherein:

the first subsystem and the second subsystem are configured to control the steering actuator in opposite steering directions;

the fault detection device is configured to: (i) determine and deactivate a faulty component of the first subsystem or the second subsystem; and (ii) cause a fault-free component of the first subsystem or the second subsystem to maintain control of the steering actuator;

each of the flow-control valve arrangement of the first subsystem and the flow-control valve arrangement of the second subsystem includes an inlet valve and a discharge valve, the inlet valve and the discharge valve being continuous-control valves configured to be electrically actuated by control signals that, when the control signals are compared with each other by the fault detection device and a deviation from reference data is determined, lead to deactivation of at least one of the release valves or the continuous-control valves that is detected as faulty;

the release valves are 4/3-way directional valves; and the continuous-control valves are flow-control valves.

7. The hydraulic power steering system of claim 6, wherein the flow-control valves are 2/2-way flow-control valves.

8. A hydraulic power steering system, comprising:

a steering actuator;

a first subsystem including a flow-control valve arrangement including a release valve;

a second subsystem including a flow-control valve arrangement including a release valve;

a fault detection device;

electrical signal lines; and actuating solenoid devices, wherein:

the first subsystem and the second subsystem are configured to control the steering actuator in opposite steering directions;

the fault detection device is configured to: (i) determine and deactivate a faulty component of the first subsystem or the second subsystem; and (ii) cause a fault-free component of the first subsystem or the second subsystem to maintain control of the steering actuator;

each of the flow-control valve arrangement of the first subsystem and the flow-control valve arrangement of the second subsystem includes an inlet valve and a discharge valve, the inlet valve and the discharge valve being continuous-control valves configured to be electrically actuated by control signals that, when the control signals are compared with each other by the fault detection device and a deviation from reference data is determined, lead to deactivation of at least one of the release valves or the continuous-control valves that is detected as faulty;

the steering actuator is a hydraulic synchronous cylinder including a first fluid chamber and a second fluid chamber;

the first fluid chamber and the second fluid chamber are separated by a piston;

each of the first fluid chamber and the second fluid chamber is directly connected to an output side of the release valve of the first subsystem and an output side of the release valve of the second subsystem;

the actuating solenoid devices are for the release valves and the continuous-control valves; and the electrical signal lines connect the actuating solenoid devices to the fault detection device.

9. A hydraulic power steering system, comprising:

a steering actuator;

a first subsystem including a flow-control valve arrangement including a release valve;

a second subsystem including a flow-control valve arrangement including a release valve;

a fault detection device; and for each of the first subsystem and the second subsystem:

(i) a hydraulic load tap; and (ii) a hydraulic supply, wherein:

the first subsystem and the second subsystem are configured to control the steering actuator in opposite steering directions;

the fault detection device is configured to: (i) determine and deactivate a faulty component of the first subsystem or the second subsystem; and (ii) cause a fault-free component of the first subsystem or the second subsystem to maintain control of the steering actuator;

each of the flow-control valve arrangement of the first subsystem and the flow-control valve arrangement of the second subsystem includes an inlet valve and a discharge valve, the inlet valve and the discharge valve being continuous-control valves configured to be electrically actuated by control signals that, when the control signals are compared with each other by the fault detection device and a deviation from reference data is determined, lead to deactivation of at least one of the release valves or the continuous-control valves that is detected as faulty;

the steering actuator is a hydraulic synchronous cylinder including a first fluid chamber and a second fluid chamber;

the first fluid chamber and the second fluid chamber are separated by a piston;

each of the first fluid chamber and the second fluid chamber is directly connected to an output side of the release valve of the first subsystem and an output side of the release valve of the second subsystem;

the hydraulic load tap is between the inlet valve and the release valve;

the hydraulic load tap is connected to the hydraulic supply; and the hydraulic supply is configured to supply the inlet valve with a pressurized fluid.

10. A hydraulic power steering system, comprising:

a steering actuator;

a first subsystem including a flow-control valve arrangement including a release valve;

a second subsystem including a flow-control valve arrangement including a release valve;

a fault detection device; and a position monitor configured to monitor the steering actuator as part of the fault detection device, wherein:

the first subsystem and the second subsystem are configured to control the steering actuator in opposite steering directions;

the fault detection device is configured to: (i) determine and deactivate a faulty component of the first subsystem or the second subsystem; and (ii) cause a fault-free component of the first subsystem or the second subsystem to maintain control of the steering actuator;

each of the flow-control valve arrangement of the first subsystem and the flow-control valve arrangement of the second subsystem includes an inlet valve and a discharge valve, the inlet valve and the discharge valve being continuous-control valves configured to be electrically actuated by control signals that, when the control signals are compared with each other by the fault detection device and a deviation from reference data is determined, lead to deactivation of at least one of the release valves or the continuous-control valves that is detected as faulty;

the steering actuator is a hydraulic synchronous cylinder including a first fluid chamber and a second fluid chamber;

the first fluid chamber and the second fluid chamber are separated by a piston; and each of the first fluid chamber and the second fluid chamber is directly connected to an output side of the release valve of the first subsystem and an output side of the release valve of the second subsystem.

11. A hydraulic power steering system, comprising:

a steering actuator;

a first subsystem including a flow-control valve arrangement including a release valve;

a second subsystem including a flow-control valve arrangement including a release valve; and a fault detection device, wherein:

the first subsystem and the second subsystem are configured to control the steering actuator in opposite steering directions;

the fault detection device is configured to: (i) determine and deactivate a faulty component of the first subsystem or the second subsystem; and (ii) cause a fault-free component of the first subsystem or the second subsystem to maintain control of the steering actuator;

each of the flow-control valve arrangement of the first subsystem and the flow-control valve arrangement of the second subsystem includes an inlet valve and a discharge valve, the inlet valve and the discharge valve being continuous-control valves configured to be electrically actuated by control signals that, when the control signals are compared with each other by the fault detection device and a deviation from reference data is determined, lead to deactivation of at least one of the release valves or the continuous-control valves that is detected as faulty;

the steering actuator is a hydraulic synchronous cylinder including a first fluid chamber and a second fluid chamber;

the first fluid chamber and the second fluid chamber are separated by a piston;

each of the first fluid chamber and the second fluid chamber is directly connected to an output side of the release valve of the first subsystem and an output side of the release valve of the second subsystem;

the first fluid chamber is directly connected to a first port of the release valve of the first subsystem and a first port of the release valve of the second subsystem; and the second fluid chamber is directly connected to a second port of the release valve of the first subsystem and a second port of the release valve of the second subsystem.

* * * * *